(12) United States Patent
Alvo et al.

(10) Patent No.: US 11,556,973 B2
(45) Date of Patent: Jan. 17, 2023

(54) METHOD, SYSTEM, AND MEDIUM FOR TRANSFORMING TRANSACTION DATA TO SUBSCRIPTION DATA USING DISPARATE COMPUTING PLATFORMS

(71) Applicants: Greg E. Alvo, Brooklyn, NY (US); Jorge E. Escobar, Brooklyn, NY (US)

(72) Inventors: Greg E. Alvo, Brooklyn, NY (US); Jorge E. Escobar, Brooklyn, NY (US)

(73) Assignee: OrderGroove, Inc., New York, NY (US)

( * ) Notice: Subject to any disclaimer, the term of this patent is extended or adjusted under 35 U.S.C. 154(b) by 532 days.

(21) Appl. No.: 16/590,210

(22) Filed: Oct. 1, 2019

(65) Prior Publication Data

US 2020/0104903 A1 Apr. 2, 2020

Related U.S. Application Data

(63) Continuation of application No. 13/962,213, filed on Aug. 8, 2013, now Pat. No. 10,453,112.
(Continued)

(51) Int. Cl.
*G06Q 30/00* (2012.01)
*G06Q 30/06* (2012.01)

(52) U.S. Cl.
CPC .................... *G06Q 30/0633* (2013.01)

(58) Field of Classification Search
CPC .................................................. G06Q 30/0633
(Continued)

(56) References Cited

U.S. PATENT DOCUMENTS

| 4,814,996 A | 3/1989 | Wang |
| 4,869,266 A | 9/1989 | Taylor et al. |

(Continued)

FOREIGN PATENT DOCUMENTS

| AU | 8694301 A | 3/2002 |
| JP | 2000148432 A | 5/2000 |
| WO | 2019089480 A2 | 5/2019 |

OTHER PUBLICATIONS

Lowry, P., Wells, T., Moody, G., Humpherys, S., Online Payment Gateways Used To Facilitate E-Commerce Transactions and Improve Risk Management, Jan. 2006, Communications of AIS, vol. 17, Article 6, pp. 1-49.) (Year: 2006).*

(Continued)

*Primary Examiner* — Jeffrey A. Smith
*Assistant Examiner* — Brittany E Bargeon
(74) *Attorney, Agent, or Firm* — Kokka & Backus, PC

(57) ABSTRACT

Techniques for transforming transaction data to subscription data using disparate computing platforms is described, including receiving an input configured to request data associated with a product, generating javascript used to render a web page including the data retrieved using a product identifier, invoking a controller script to request a widget file generated compositely to include an offer identifier, a session identifier, a merchant identifier, and the product identifier, calling a platform associated with the second server to determine whether a subscription is associated with the product identifier, and injecting the data, other data, and further data in a composite interface that is configured to simultaneously present a shopping cart with product content and subscription content.

14 Claims, 9 Drawing Sheets

Related U.S. Application Data

(60) Provisional application No. 61/791,873, filed on Mar. 15, 2013.

(58) Field of Classification Search
USPC .................................................... 705/26.8
See application file for complete search history.

(56) References Cited

U.S. PATENT DOCUMENTS

| | | | |
|---|---|---|---|
| 5,090,734 | A | 2/1992 | Dyer et al. |
| 6,204,763 | B1 | 3/2001 | Sone |
| 6,415,262 | B1* | 7/2002 | Walker ............... G06Q 30/02 |
| | | | 705/14.25 |
| 6,963,848 | B1 | 11/2005 | Brinkerhoff |
| 7,251,617 | B1* | 7/2007 | Walker ............... G06Q 20/20 |
| | | | 705/16 |
| 7,295,990 | B1 | 11/2007 | Braumoeller et al. |
| 7,340,414 | B2 | 3/2008 | Roh et al. |
| 7,353,194 | B1 | 4/2008 | Kerker et al. |
| 7,540,767 | B1 | 6/2009 | Czarnecki |
| 7,552,068 | B1 | 6/2009 | Brinkerhoff |
| 7,747,543 | B1 | 6/2010 | Braumoeller et al. |
| 7,953,645 | B2 | 5/2011 | Kerker et al. |
| 8,121,876 | B1 | 2/2012 | Braumoeller et al. |
| 8,126,784 | B1 | 2/2012 | Agarwal |
| 8,353,448 | B1* | 1/2013 | Miller ................. G06Q 20/425 |
| | | | 235/379 |
| 8,370,271 | B1 | 2/2013 | Robinson et al. |
| 8,417,639 | B1 | 4/2013 | Baram |
| 8,428,988 | B1 | 4/2013 | Braumoeller et al. |
| 8,458,051 | B1* | 6/2013 | Saltzman .............. G06Q 20/02 |
| | | | 705/26.7 |
| 8,498,888 | B1 | 7/2013 | Raff et al. |
| 8,620,707 | B1 | 12/2013 | Belyi et al. |
| 8,818,836 | B1 | 8/2014 | Braumoeller et al. |
| 8,867,401 | B1 | 10/2014 | Tomay et al. |
| 8,924,262 | B2 | 12/2014 | Shuster |
| 9,047,607 | B1 | 6/2015 | Curial et al. |
| 9,134,675 | B2 | 9/2015 | Yang et al. |
| 9,659,310 | B1 | 5/2017 | Allen et al. |
| 9,792,643 | B1 | 10/2017 | Masterman |
| 9,886,810 | B1 | 2/2018 | Murphy |
| 9,959,565 | B2 | 5/2018 | Shuster |
| 10,262,294 | B1 | 4/2019 | Hahn et al. |
| 10,275,740 | B2 | 4/2019 | Alvo et al. |
| 10,332,067 | B2 | 6/2019 | Sirisilla et al. |
| 10,360,617 | B2 | 7/2019 | High et al. |
| 10,430,858 | B1 | 10/2019 | Glasgow et al. |
| 10,445,751 | B2 | 10/2019 | Nakano et al. |
| 10,453,112 | B2 | 10/2019 | Alvo et al. |
| 10,586,266 | B2 | 3/2020 | Fredrich et al. |
| 10,614,501 | B2 | 4/2020 | Fredrich et al. |
| 10,719,860 | B2 | 7/2020 | Bifolco et al. |
| 10,769,708 | B2 | 9/2020 | Alvo et al. |
| 10,796,274 | B2 | 10/2020 | Putcha et al. |
| 10,817,885 | B2 | 10/2020 | Concannon et al. |
| 11,144,980 | B2 | 10/2021 | Fredrich et al. |
| 2002/0161652 | A1 | 10/2002 | Paullin et al. |
| 2002/0161670 | A1* | 10/2002 | Walker ............... G06Q 30/0603 |
| | | | 705/26.1 |
| 2003/0004784 | A1 | 1/2003 | Li et al. |
| 2003/0110103 | A1 | 6/2003 | Sesek et al. |
| 2003/0195788 | A1 | 10/2003 | Loeb et al. |
| 2003/0212614 | A1 | 11/2003 | Chu et al. |
| 2004/0111326 | A1 | 6/2004 | Rock et al. |
| 2004/0162880 | A1 | 8/2004 | Arnone et al. |
| 2005/0150951 | A1 | 7/2005 | Sacco et al. |
| 2005/0165656 | A1* | 7/2005 | Frederick ............ G06Q 30/0601 |
| | | | 705/26.1 |
| 2008/0015951 | A1 | 1/2008 | Kerker et al. |
| 2008/0071626 | A1 | 3/2008 | Hill |
| 2009/0024801 | A1* | 1/2009 | Choi ................... G06F 16/9574 |
| | | | 711/144 |
| 2009/0094121 | A1 | 4/2009 | Newhouse et al. |
| 2010/0102082 | A1 | 4/2010 | Ebrom et al. |
| 2010/0217450 | A1 | 8/2010 | Beal et al. |
| 2010/0280960 | A1 | 11/2010 | Ziotopoulos et al. |
| 2011/0032070 | A1 | 2/2011 | Bleile |
| 2011/0054935 | A1 | 3/2011 | Hardaway |
| 2011/0153466 | A1 | 6/2011 | Harish et al. |
| 2011/0246215 | A1 | 10/2011 | Postma et al. |
| 2011/0251807 | A1 | 10/2011 | Rada et al. |
| 2011/0258072 | A1 | 10/2011 | Kerker et al. |
| 2012/0004977 | A1* | 1/2012 | Daniels, Jr. ........... G06Q 30/02 |
| | | | 705/14.41 |
| 2012/0036045 | A1* | 2/2012 | Lowe .................... G06Q 20/385 |
| | | | 705/26.44 |
| 2012/0124859 | A1 | 5/2012 | May et al. |
| 2012/0150461 | A1 | 6/2012 | Ohiwa et al. |
| 2012/0150677 | A1 | 6/2012 | Shuster |
| 2013/0041605 | A1 | 2/2013 | Ting et al. |
| 2013/0080968 | A1 | 3/2013 | Hanson et al. |
| 2013/0117053 | A2 | 5/2013 | Campbell |
| 2013/0128396 | A1 | 5/2013 | Danesh et al. |
| 2013/0159454 | A1 | 6/2013 | Hunter et al. |
| 2013/0268315 | A1 | 10/2013 | Cotton et al. |
| 2014/0012706 | A1* | 1/2014 | Foerster ................ G06Q 30/04 |
| | | | 705/26.81 |
| 2014/0191573 | A1 | 7/2014 | Chen et al. |
| 2014/0258165 | A1 | 9/2014 | Heil |
| 2014/0279208 | A1 | 9/2014 | Nickitas et al. |
| 2014/0279215 | A1 | 9/2014 | Alvo et al. |
| 2014/0279291 | A1 | 9/2014 | Brosnan et al. |
| 2014/0297487 | A1 | 10/2014 | Bashkin |
| 2014/0304026 | A1 | 10/2014 | Delaney et al. |
| 2014/0324598 | A1 | 10/2014 | Freeman |
| 2015/0019342 | A1 | 1/2015 | Gupta |
| 2015/0105880 | A1 | 4/2015 | Slupik et al. |
| 2015/0106228 | A1 | 4/2015 | Shuster |
| 2015/0106238 | A1 | 4/2015 | Shuster |
| 2015/0112826 | A1 | 4/2015 | Crutchfield, Jr. |
| 2015/0127421 | A1 | 5/2015 | Nakano et al. |
| 2015/0178654 | A1 | 6/2015 | Glasgow et al. |
| 2015/0261644 | A1 | 9/2015 | Zhang et al. |
| 2015/0302510 | A1 | 10/2015 | Godsey et al. |
| 2015/0363866 | A1 | 12/2015 | Depew |
| 2015/0363867 | A1 | 12/2015 | Tipton et al. |
| 2016/0034024 | A1 | 2/2016 | Mergen |
| 2016/0148149 | A1 | 5/2016 | Suddamalla et al. |
| 2016/0218884 | A1 | 7/2016 | Ebrom et al. |
| 2016/0231792 | A1 | 8/2016 | Richter et al. |
| 2016/0275424 | A1 | 9/2016 | Concannon et al. |
| 2016/0275530 | A1 | 9/2016 | Concannon et al. |
| 2016/0286059 | A1 | 9/2016 | Hitaka |
| 2016/0314514 | A1 | 10/2016 | High et al. |
| 2016/0356641 | A1 | 12/2016 | Larson |
| 2016/0371762 | A1 | 12/2016 | Fergis et al. |
| 2017/0011304 | A1 | 1/2017 | Shimizu |
| 2017/0019266 | A1 | 1/2017 | Lim et al. |
| 2017/0032101 | A1 | 2/2017 | Skoda |
| 2017/0109687 | A1 | 4/2017 | Kamadolli et al. |
| 2017/0134182 | A1 | 5/2017 | Davis et al. |
| 2017/0206489 | A1 | 7/2017 | Sirisilla et al. |
| 2017/0300984 | A1 | 10/2017 | Hurwich |
| 2018/0005173 | A1 | 1/2018 | Elazary et al. |
| 2018/0031616 | A1 | 2/2018 | Hansen et al. |
| 2018/0053153 | A1 | 2/2018 | Mai |
| 2018/0082038 | A1 | 3/2018 | Blair et al. |
| 2018/0089614 | A1 | 3/2018 | Laskowitz et al. |
| 2018/0131658 | A1 | 5/2018 | Bhagwan et al. |
| 2018/0144290 | A1 | 5/2018 | Alvo et al. |
| 2018/0144389 | A1 | 5/2018 | Fredrich et al. |
| 2018/0204256 | A1 | 7/2018 | Bifolco et al. |
| 2018/0253952 | A1 | 9/2018 | Huang |
| 2018/0285809 | A1 | 10/2018 | Fredrich et al. |
| 2018/0315111 | A1 | 11/2018 | Alvo et al. |
| 2018/0322447 | A1 | 11/2018 | Cantrell |
| 2018/0336512 | A1 | 11/2018 | Clarke et al. |
| 2018/0349980 | A1 | 12/2018 | Alvo et al. |
| 2018/0357688 | A1 | 12/2018 | Webb et al. |
| 2018/0365753 | A1 | 12/2018 | Fredrich et al. |
| 2019/0066183 | A1 | 2/2019 | Fredrich et al. |
| 2019/0073627 | A1 | 3/2019 | Nakdimon et al. |

(56) References Cited

U.S. PATENT DOCUMENTS

| | | | |
|---|---|---|---|
| 2019/0087769 | A9 | 3/2019 | Glasgow et al. |
| 2019/0295148 | A1 | 9/2019 | Lefkow et al. |
| 2019/0295150 | A1 | 9/2019 | High et al. |
| 2019/0392378 | A1 | 12/2019 | Alvo et al. |
| 2020/0250727 | A1 | 8/2020 | Fredrich et al. |
| 2020/0250728 | A1 | 8/2020 | Fredrich et al. |
| 2021/0004881 | A1 | 1/2021 | Bifolco et al. |
| 2021/0049670 | A1 | 2/2021 | Alvo et al. |

OTHER PUBLICATIONS

Eskridge, Cory W., Final Office Action dated Feb. 21, 2020 for U.S. Appl. No. 15/479,230.
Koester, Michael Richard, Final Office Action dated Jun. 5, 2020 for U.S. Appl. No. 15/716,586.
Mitchell, Nathan A., Non-Final Office Action for U.S. Appl. No. 15/905,764 dated Mar. 18, 2020.
Ricker, Thomas; "Wanted: An Amazon Fridge That Automatically Reorders Food," Published Jan. 18, 2017; Retrieved From on Mar. 18, 2020.
Amazon Dash Replenishment Adds New Device Makers and Launches New Products. Retrieved from . Originally published Nov. 22, 2016. (Year: 2016).
Eskridge, Cory W., Final Office Action dated Apr. 6, 2021 for U.S. Appl. No. 15/479,230.
Eskridge, Cory W., Non-Final Office Action dated Aug. 18, 2020 for U.S. Appl. No. 15/479,230.
Koester, Michael R., Non-Final Office Action dated Jan. 8, 2021 for U.S. Appl. No. 15/716,486.
Mitchell, Nathan A., Non-Final Office Action dated Mar. 23, 2021 for U.S. Appl. No. 16/398,241.
Vodnick, Craig, "How Do You Handle Subscription Renewals?", Published Mar. 28, 2011, Cleverbridge Blog, URL: <> (Year: 2011).
Garg, Yogesh C., Non-Final Office Action dated Oct. 18, 2021 for U.S. Appl. No. 16/930,825.
Koester, Michael R., Notice of Allowance and Fee(s) Due, Examiner Interview Summary and Examiner's Amendment dated Jun. 10, 2021 for U.S. Appl. No. 15/716,486.
Mitchell, Nathan A., Final Office Action dated Jul. 28, 2021 for U.S. Appl. No. 15/905,764.
Mitchell, Nathan A., Final Office Action dated Jul. 28, 2021 for U.S. Appl. No. 16/398,241.
"Belkin WeMo Insight Switch", Belkin Instruction Manual, Part# 8830uk17750/SKU: F7C029uk, Oct. 23, 2014, http://www.free-instruction-manuals.com/pdf/pa_1184191 .pdf.
"WeMo Insight Smart Plug, F7C029 Frequently Asked Questions", Belkin Knowledge Article, retrieved Nov. 9, 2017, http://www.belkin.com/us/support-article?articleNum=80139.
Alvo et al., "Consumable Usage Sensors and Applications to Facilitate Automated Replenishment of Consumables via an Adaptive Distribution Platform," U.S. Appl. No. 62/579,871, filed Dec. 31, 2017.
Alvo et al., "Consumable Usage Sensors and Applications to Facilitate Automated Replenishment of Consumables via an Adaptive Distribution Platform," U.S. Appl. No. 15/801,002, filed Nov. 1, 2017.
Alvo et al., "Consumable Usage Sensors and Applications to Facilitate Automated Replenishment of Consumables via an Adaptive Distribution Platform," U.S. Appl. No. 62/579,872.
Alvo et al., "Consumable Usage Sensors and Applications to Facilitate Automated Replenishment of Consumables via an Adaptive Distribution Platform," U.S. Appl. No. 15/801,172, filed Nov. 1, 2017.
Alvo et al., Consumable Usage Sensors and Applications to Facilitate Automated Replenishment of Consumables via an Adaptive Distribution Platform, U.S. Appl. No. 16/398,241, filed Apr. 29, 2019.

Alvo, Greg, "Automated Method and System for Converting One-Time Buyers of a Product/Service Into Recurring Subscribers", U.S. Appl. No. 61/791,873, filed Mar. 15, 2013.
Amazon, "Order a Subscribe & Save Subscription," archived back at least as far as Oct. 2014, accessed Jul. 10, 2019 at https://web.archive.org/web/20141009140840/http://www.amazon.com/gp/help/customer/display.html?nodeId=201125870.
Anonymous, Amazon.com Launches Magazines Store; Customers Can Now Purchase Magazine Subscriptions for Themselves or as Gifts on Amazon.com, Oct. 30, 2001, Business Water, pp. 1-2. (Year: 2001).
Bargeon, Brittany E., Notice of Allowance and Fee(s) Due for U.S. Appl. No. 13/962,213 dated Jul. 25, 2019.
Bargeon, Brittany E., U.S. Patent and Trademark Office Final Office Action dated Oct. 23, 2015 for U.S. Appl. No. 13/962,213 (24 pages).
Bargeon, Brittany E., U.S. Patent and Trademark Office Non-Final Office Action dated Aug. 14, 2014 for U.S. Appl. No. 13/962,213 (21 pages).
Bargeon, Brittany E., U.S. Patent and Trademark Office Non-Final Office Action dated Jun. 9, 2016 for U.S. Appl. No. 13/962,213 (26 pages).
Bargeon, Brittany E., U.S. Patent and Trademark Office Non-Final Office Action dated Nov. 18, 2016 for U.S. Appl. No. 13/962,213 (22 pages).
Bifolco et al., "Adaptive Scheduling To Facilitate Optimized Distribution of Subscribed Items", U.S. Provisional PatentU.S. Appl. No. 62/425,191, filed Nov. 22, 2016.
Bifolco et al., "Adaptive Scheduling to Facilitate Optimized Distribution of Subscribed Items," U.S. Appl. No. 15/821,362, filed Nov. 22, 2017.
CTIA's Annual Survey Says US Wireless Providers Handled 3.2 Trillion Megabytes of Data Traffic in 2013 for a 120 Percent Increase Over 2012, Jun. 17, 2014, https://web.archive.org/web/20140723023447/http://www.ctia.org/resource-library/press-releases/archive/ctia-annual-survey-2013.
Fredrich et al., "Adaptive Scheduling of Electronic Messaging Based on Predictive Consumption of the Sampling of Items via a Networked Computing Platform", U.S. Appl. No. 15/716,486, filed Sep. 26, 2017.
Fredrich et al., "Dynamic Processing of Electronic Messaging Data and Protocols to Automatically Generate Location Predictive Retrieval Using a Networked, Multi-Stack Computing Environment," U.S. Appl. No. 16/046,690, filed Jul. 26, 2018.
Fredrich et al., "Dynamic Processing of Electronic Messaging Data and Protocols to Automatically Generate Location Predictive Retrieval Using a Networked, Multi-Stack Computing Environment," U.S. Appl. No. 16/115,474, filed Aug. 28, 2018.
Fredrich et al., "Electronic Messaging to Distribute Items Based on Adaptive Scheduling", U.S. Appl. No. 15/479,230, filed Apr. 4, 2017.
Kim, Harry C., Notification of Transmittal of the International Search Report and the Written Opinion of the International Searching Authority, or the Declaration for International Application No. PCT/US2018/058053 dated May 7, 2019.
Mahone, Kristie A., Final Office Action for U.S. Appl. No. 15/801,002 dated Sep. 28, 2018.
Mahone, Kristie A., Non-Final Office Action for U.S. Appl. No. 15/801,002 dated Mar. 8, 2018.
Mitchell, Nathan A., Notice of Allowance and Fee(s) Due dated Mar. 1, 2019 for U.S. Appl. No. 15/801,002.
Rao, Leena, "Amazon to Add Trash Cans, Dishwashers, Dryers to Smart Reordering Service." Published Aug. 2016. Retrieved from on Feb. 22, 2019.
Ricker, Thomas; "Wanted: An Amazon Fridge That Automatically Reorders Food." Published Jan. 2017. Retrieved from on Feb. 22, 2019.
Stinson, Tanner, "AmazonKitchen DRS", Hackster Project, Published Feb. 5, 2017, https://www.hackster.io/tanner-stinson/amazonkitchen-drs-75fc24?ref=challenge&ref_id=78&offset=9.
Zimmerman, Jeffrey P., Final Office Action dated Apr. 15, 2019 for U.S. Appl. No. 16/046,690.

(56) References Cited

OTHER PUBLICATIONS

Zimmerman, Jeffrey P., Final Office Action dated Apr. 15, 2019 for U.S. Appl. No. 16/115,474.
Zimmerman, Jeffrey P., Non-Final Office Action for U.S. Appl. No. 16/046,690 dated Dec. 10, 2018.
Zimmerman, Jeffrey P., Non-Final Office Action for U.S. Appl. No. 16/115,474 dated Dec. 6, 2018.
Zimmerman, Jeffrey P., Non-Final Office Action dated Jul. 15, 2019 for U.S. Appl. No. 16/115,474.
Zimmerman, Jeffrey P., Non-Final Office Action dated Jun. 20, 2019 for U.S. Appl. No. 15/479,230.
Zimmerman, Jeffrey P., Non-Final Office Action dated Jun. 20, 2019 for U.S. Appl. No. 16/046,690.
Garg, Yogesh C., Non-Final Office Action dated Nov. 12, 2019 for U.S. Appl. No. 15/821,362.
Koester, Michael Richard, Non-Final Office Action dated Nov. 25, 2019 for U.S. Appl. No. 15/716,486.
Wilder, Andrew H., Non-Final Office Action dated Nov. 25, 2019 for U.S. Appl. No. 15/801,172.

\* cited by examiner

METHOD, SYSTEM, AND MEDIUM FOR TRANSFORMING TRANSACTION DATA TO SUBSCRIPTION DATA USING DISPARATE COMPUTING PLATFORMS

CROSS-REFERENCE TO RELATED APPLICATIONS

This application is continuation application of copending U.S. patent application Ser. No. 13/962,213, filed on Aug. 8, 2013 entitled "Methods, Apparatus, and Computer Readable Medium for Converting One-Time Buyers of a Product/Service into Subscribers," which claims the benefit of U.S. Provisional Patent Application No. 61/791,873, filed on Mar. 15, 2013, all of which are herein incorporated by reference in their entirety for all purposes.

FIELD

The present disclosure relates to computer and data science and data analytics. More specifically, the present disclosure relates to a data processing and analytics topology configured to transform transaction data to subscription data using disparate computing platforms.

BACKGROUND

Prior to the advent of Internet-based shopping, retailers and service providers grew accustomed to maintaining a loyal following of regular customers. Due to limited access to information about prices, quality of goods and services, and customer service provided by the retailers and/or service providers, a customer was likely to seek out a source for a particular good or service once and, if pleased with the good or service, return to the retailer or service provider for subsequent purchases.

As the Internet has progressed in the past several years, retailers and service providers have established online stores. As more and more retailers and service providers establish these online stores, customers' ability to access information pertinent to the retailers and service providers is increased dramatically. Instead of regularly returning to a particular retailer or service provider that the customers had become accustomed to frequently purchasing from, the customers are now able to seek out the most attractive offer for each of their individual purchases.

While this increase in access to information might be beneficial to the customers, retailers and service providers may, as a result, experience unpredictable fluctuations in purchases as well as difficulty retaining customers due to this increase in Internet-based information and the resulting purchases.

SUMMARY

Embodiments provide subscription platforms that can be incorporated into merchant webpages to implement a subscription service on pre-existing online stores. In accordance with the embodiments, subscription platforms are provided that respond at least in part to the foregoing issues and/or other issues. Platforms of the current embodiment enable Internet-based retailers or service providers (hereinafter umerchants") to add subscription services to their existing online stores.

In one embodiment, the presently disclosed subject matter (hereinafter usystem") receives from the merchant's website an indication that a potential customer has accessed a web page pertaining to a product or service. The system, in response to the indication, builds a subscription offer pertaining to the product or service. The system sends the subscription offer to the merchant's website. If the customer accepts the subscription offer, the system receives an indication from the merchant's website and the system builds a subscription order pertaining to the accepted subscription offer. At a time determined by the accepted subscription offer, the system sends the subscription order to the retailer or service provider's website.

The system can determine whether a subscription is available prior to building the subscription offer. In various embodiments, the system builds content pertaining to a product related to the subscription offer and sends that content to the merchant's website for presentation to the customer. In further embodiments, the subscription offer may be contained in a widget, a module, etc. The widget of the current embodiments deploys to the merchant's website an application program interface that receives the subscription order pertaining to the accepted subscription offer. The system can deploy a module to the retailer's or service provider's website that conveys terms of the subscription offer.

BRIEF DESCRIPTION OF THE DRAWINGS

Various novel and non-obvious features of the disclosed subject matter are set forth in the claims. The disclosed subject matter itself, however, as well as modes of use, will best be understood by reference to the detailed description when read in conjunction with the accompanying drawings, wherein:

DETAILED DESCRIPTION

Reference is now made to the drawings, in which the same reference numbers are used throughout the different figures to designate the same components.

The subscription platform and related external components and methods (hereinafter, the "system") of the current embodiments provide subscription-related content and offers to Internet-based merchants. The system of the current embodiments also responds to a subscription offer accepted by a merchant's customer by creating a related subscription order.

Figure 1:
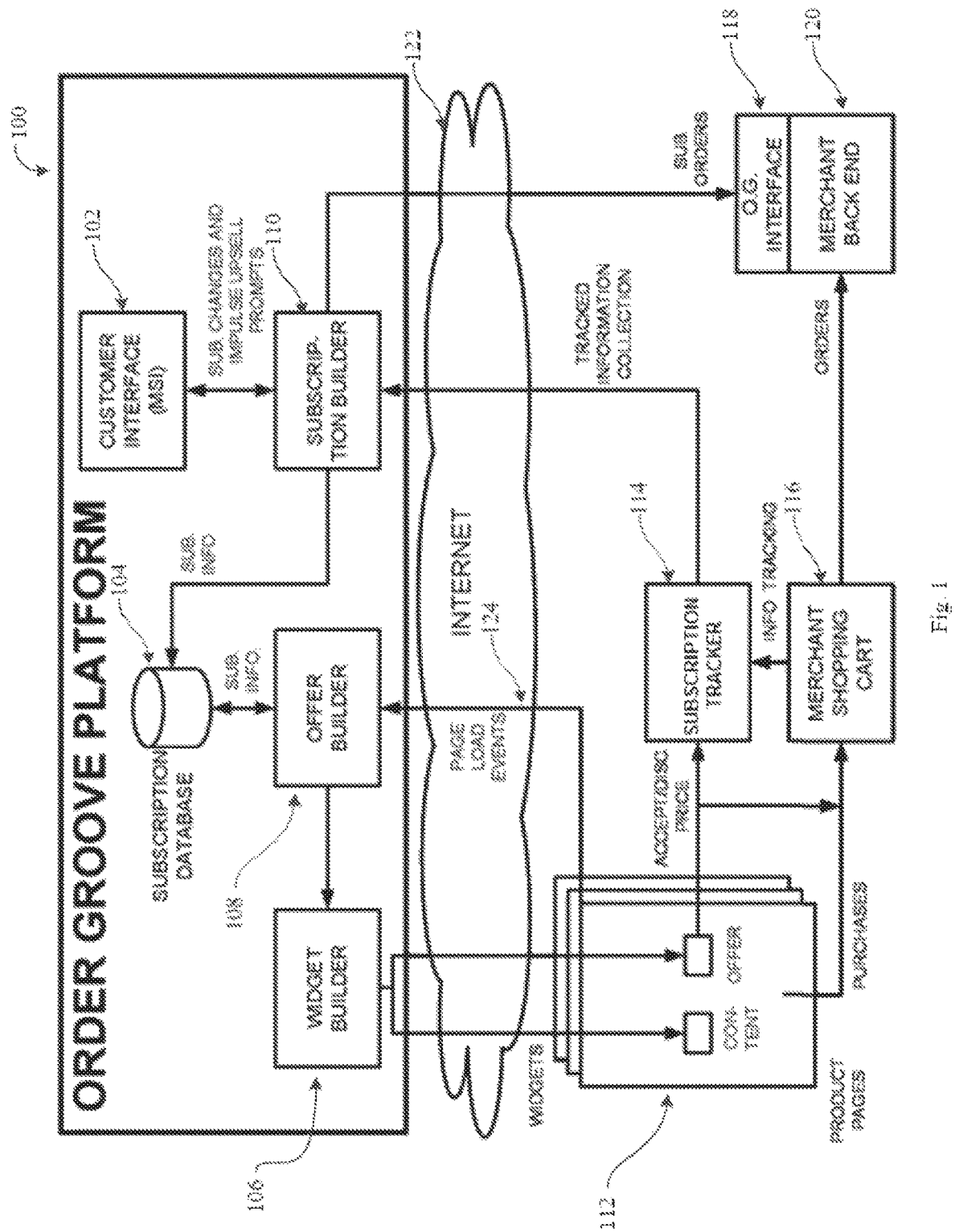
FIG. 1 depicts one embodiment of the method in which the system tracks and collects information, builds subscription offers, and delivers those subscription offers to the merchant's website.

FIG. 1 depicts one embodiment of the method in which the system 100 interacts with a merchant's product or service webpage. When the system receives from the merchant an indication of a product-page load status on the merchant website the offer builder 108 determines if a subscription is available via the subscription database 104. If a subscription is available the subscription offer is injected into the merchant's webpage via the widget builder 106. The injected subscription offer is displayed on the merchant's product or service page 112 in the current embodiment.

The subscription tracker 114 tracks the information contained in the merchant's online shopping cart 116. Subscription tracker 114 and the cart 116 also receives an indication when a subscription offer was accepted by a customer. The subscription builder 110 receives a notification from the subscription tracker 114 when the customer accepts the subscription offer. The subscription builder 110 handles the subscription order.

The customer interface 102 is accessible to a customer that has accepted a subscription offer. The customer interface 102 allows a customer to edit the terms of a subscription. The subscription builder 110 is notified when there is a change to the subscription via the customer interface 102 and can re-build the subscription if necessary.

When an online merchant's customer is ready to purchase the merchant's good or service they navigate to the merchant back end 120. The system's subscription information is incorporated into the merchant back end 120.

Figure 2:
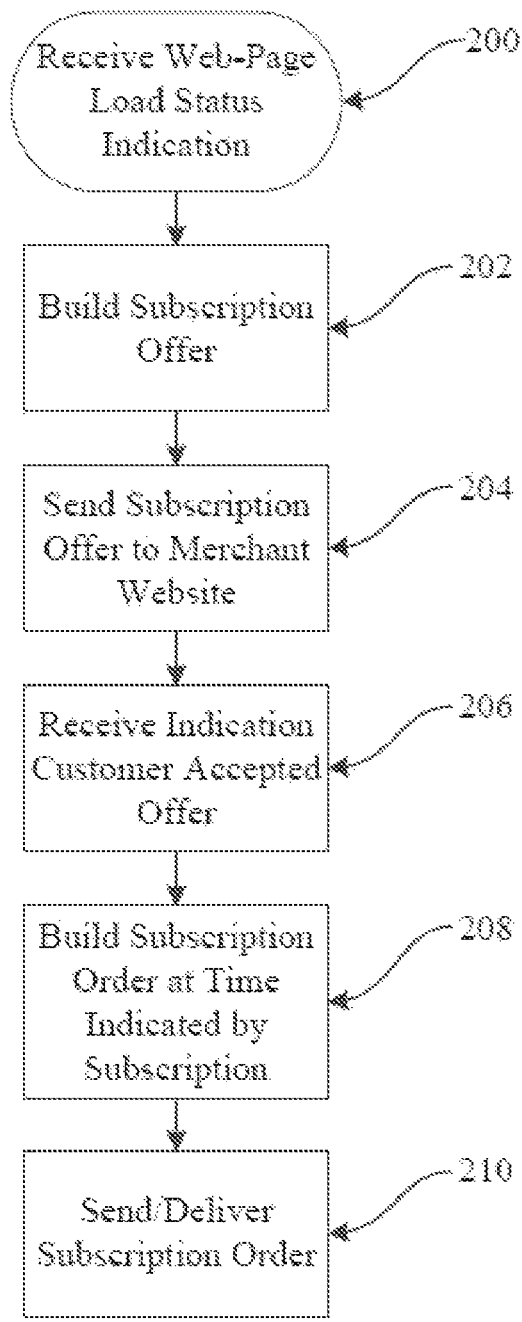
FIG. 2 depicts one embodiment of the subscription ordering system as an overview.

FIG. 2 depicts one embodiment of the process flow of the system. When an action occurs on a merchant's product or service webpage the system receives a load status indication 200 from an online merchant's webpage.

In some embodiments, the system builds a subscription offer at reference 202 in response to a load status indication from the merchant's webpage. In other embodiments, the system can first determine if a subscription is available for the particular product or service related to the received load status indication.

Once a subscription offer is prepared, the system injects the subscription offer into the merchant's product or service webpage. See reference 204. In some embodiments, the system can enter a wait state after injecting the subscription offer into the merchant's webpage. In other embodiments, the system can monitor the customer's activity on the merchant's webpage to determine if the subscription offer was accepted or not.

The system receives an indication that the subscription offer was accepted. See reference 206. The system subsequently builds a subscription order based on the accepted subscription offer at a time indicated in the accepted subscription offer. See reference 208. At that time, the system sends the subscription order pertaining to the accepted subscription offer to the merchant website via the network interface. See reference 210.

Figure 3:
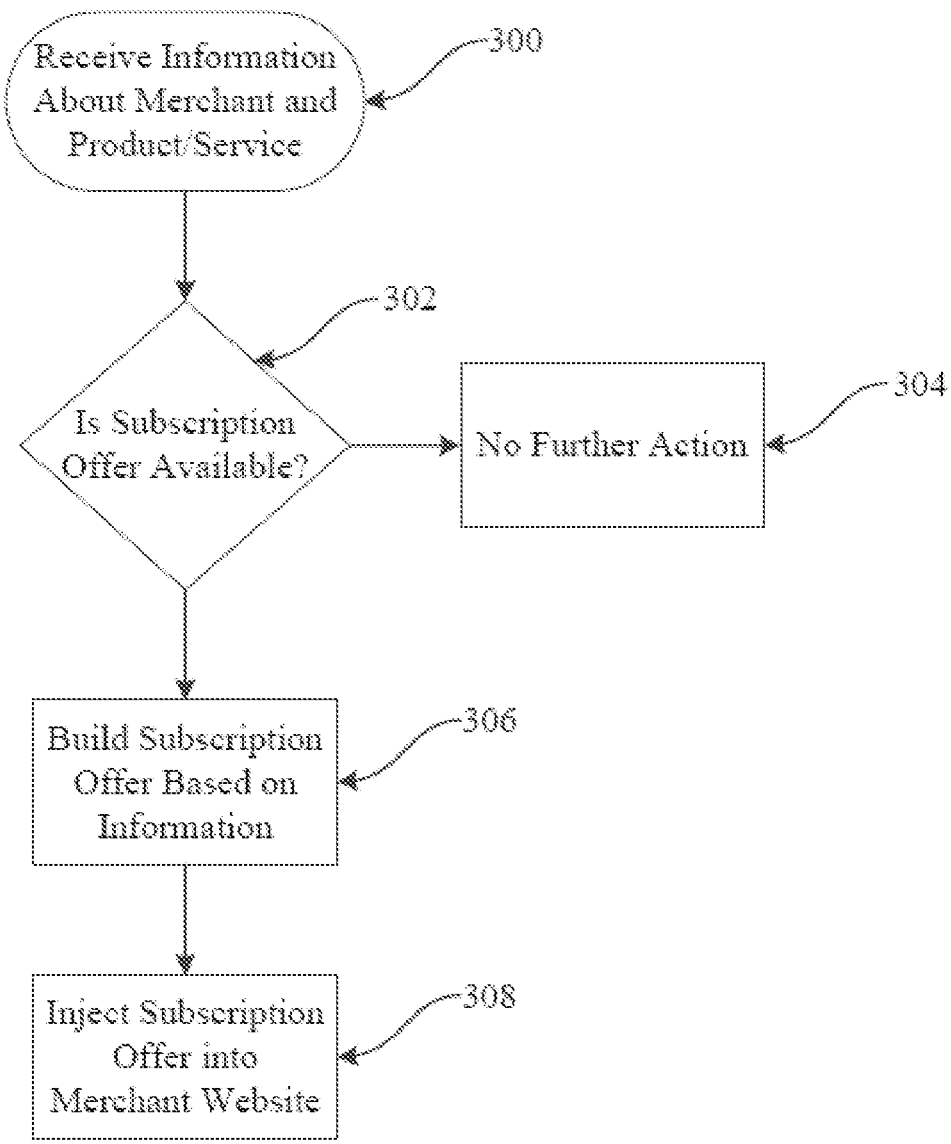
FIG. 3 depicts one embodiment of the process of building a subscription offer.

FIG. 3 depicts one embodiment of the process in which the system determines if a subscription is available for a particular product or service and subsequently builds and delivers a subscription offer for said product or service.

The system receives information related to a product or service webpage on a merchant's website at reference 300. In one embodiment, the information related to the product or service is a product or service identifier. In other embodiments, the information can be an alpha-numeric merchant identifier and an alpha-numeric product or service identifier such that the system can determine subscription availability.

The system determines if a subscription offer is available. See reference 302. In some embodiments, the system can determine whether a subscription offer is available via a database containing available subscriptions. In other embodiments, the system can determine if a subscription is available by communicating with the merchant and/or the merchant's website.

If the system determines that no subscription is available, the system will not pursue further the subscription building process at reference 304.

On the other hand, if the system determines that a subscription is available at reference 302, the system will process the product or service information and build a subscription offer at reference 306. In some embodiments, the subscription offer comprises an offer to the customer that will allow them to have the particular product or service pertaining to the subscription ordered on terms in accordance with the subscription. In other embodiments, the subscription offer can include incentives to encourage the customer to accept the subscription offer. In some embodiments, the incentive can include a discounted price for the good or service. In other embodiments, the incentive can include reduced shipping and/or handling charges, coupons for other goods or services offered by the merchant, etc.

Once the subscription offer is built, the subscription offer is injected into the merchant's website at reference 308. In some embodiments, the subscription offer is an add-on module to the merchant's website, such that the customer can see both the entire merchant's webpage as well as the content injected into that webpage by the system. In other embodiments, the system injects webpage code into the merchant's webpage so that the system's additions perform such operations on the merchant's webpage.

Figure 4:
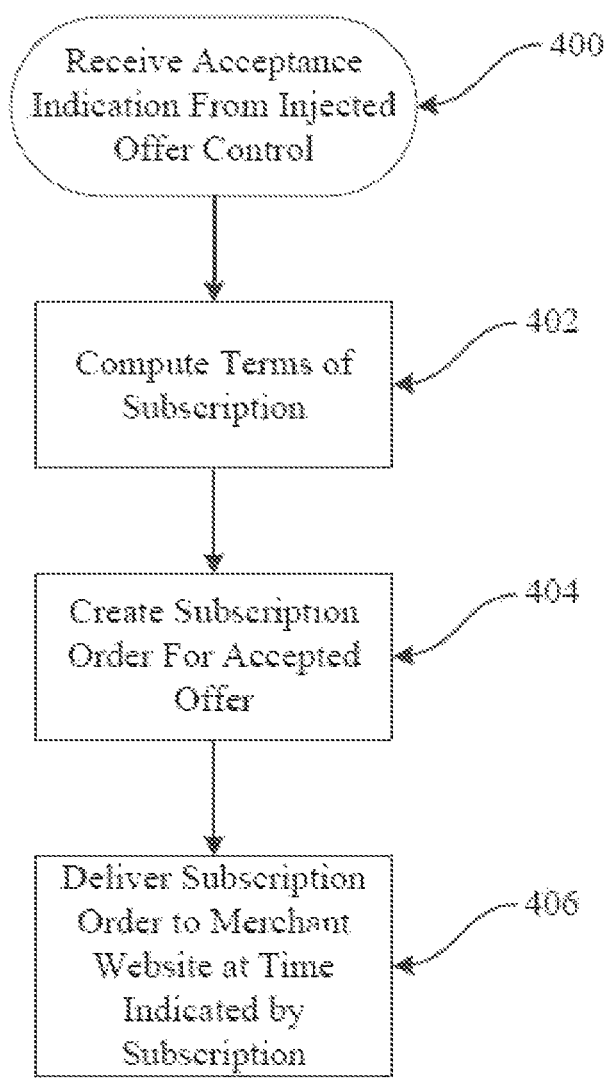
FIG. 4 depicts one embodiment of the process of building a subscription order.

FIG. 4 depicts one embodiment of the system's response to an indication that a subscription offer was accepted and other related information. The system receives an indication when the customer accepts the subscription offer at reference 400. In some embodiments, the merchant's customer can accept the subscription offer via a button injected into the merchant's webpage by the system. In other embodiments, the subscription offer can be accepted when the customer selects a subscription offer acceptance indicator and adds the product or service to their online shopping cart.

After receiving the subscription acceptance notification at reference 400, the system computes the terms of the subscription at reference 402. The subscription terms can include the date of the subscription order, the price of the good or service, etc.

Once the terms of the subscription offer are computed at reference 402, the system creates a subscription order at reference 404 from a variety of information collected during the subscription process. The system delivers the subscription order to the merchant website at a time indicated in the accepted subscription offer at reference 406. The information sent from the system to the merchant's website allows the merchant website to extract the order related information from each subscription related order and places the orders accordingly. It is the merchant website of the current embodiment, therefore, that processes each of these orders. Note also that each of these orders is for the product on the particular product page from which the subscription offer arose.

Figure 5:
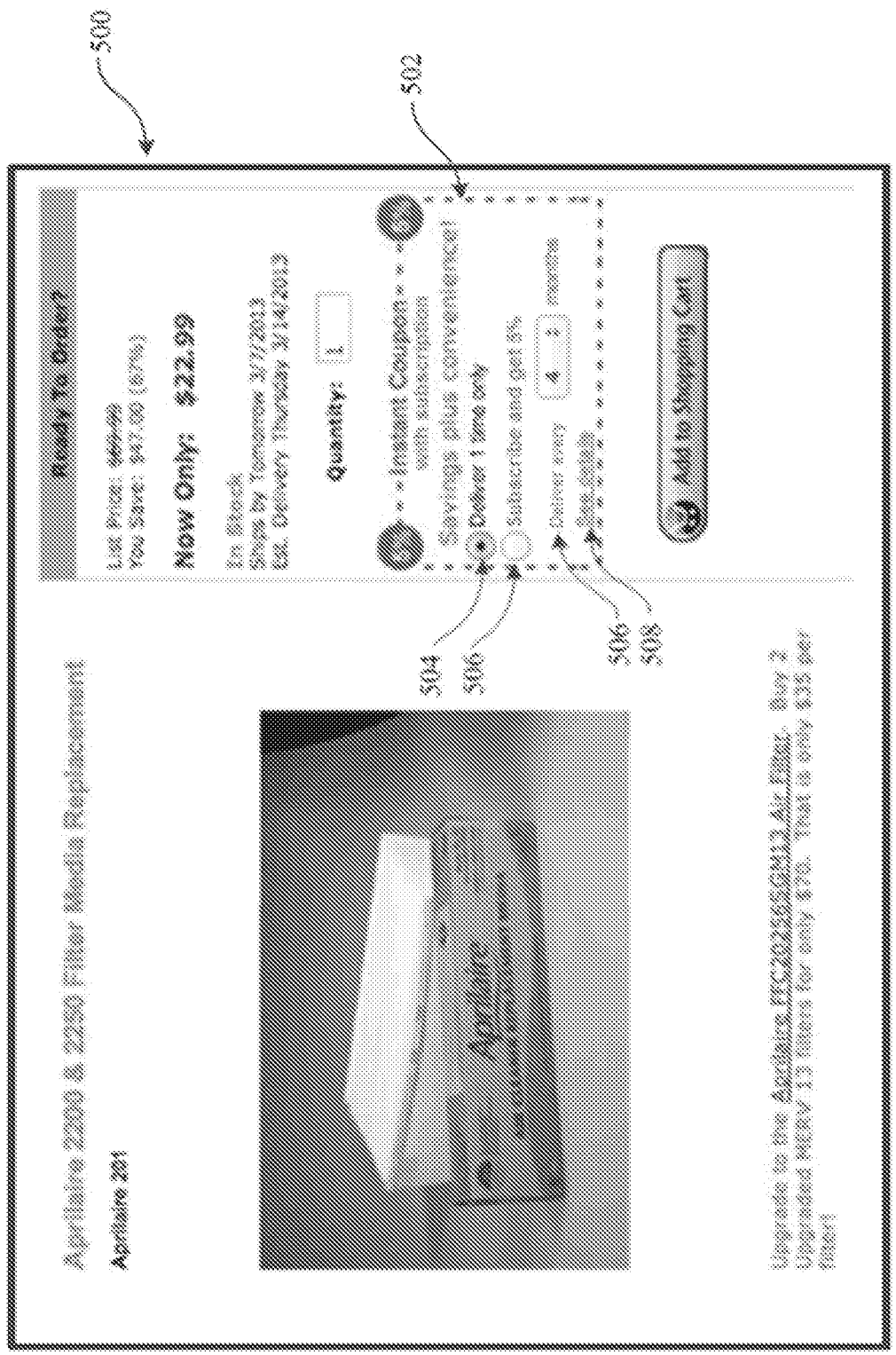
FIG. 5 depicts a screenshot of one embodiment of a merchant's product page with a subscription offer being displayed.

FIG. 5 depicts a screenshot of a merchant's product webpage 500. The system has injected a subscription offer 502 into the merchant's product webpage. The injected subscription offer includes the option to deliver the product only once 504. This can be equated to the customer not accepting the subscription offer. The merchant shopping cart 116 can process such orders. The injected subscription offer also includes the option to deliver the product 506 in accordance with the terms of the offered subscription. This includes the incentive of an offer for a discounted price for the product. In addition, the injected offer includes various options 508 and a hyperlink 510 which allows the customer to view the terms of the subscription offer.

Figure 6:
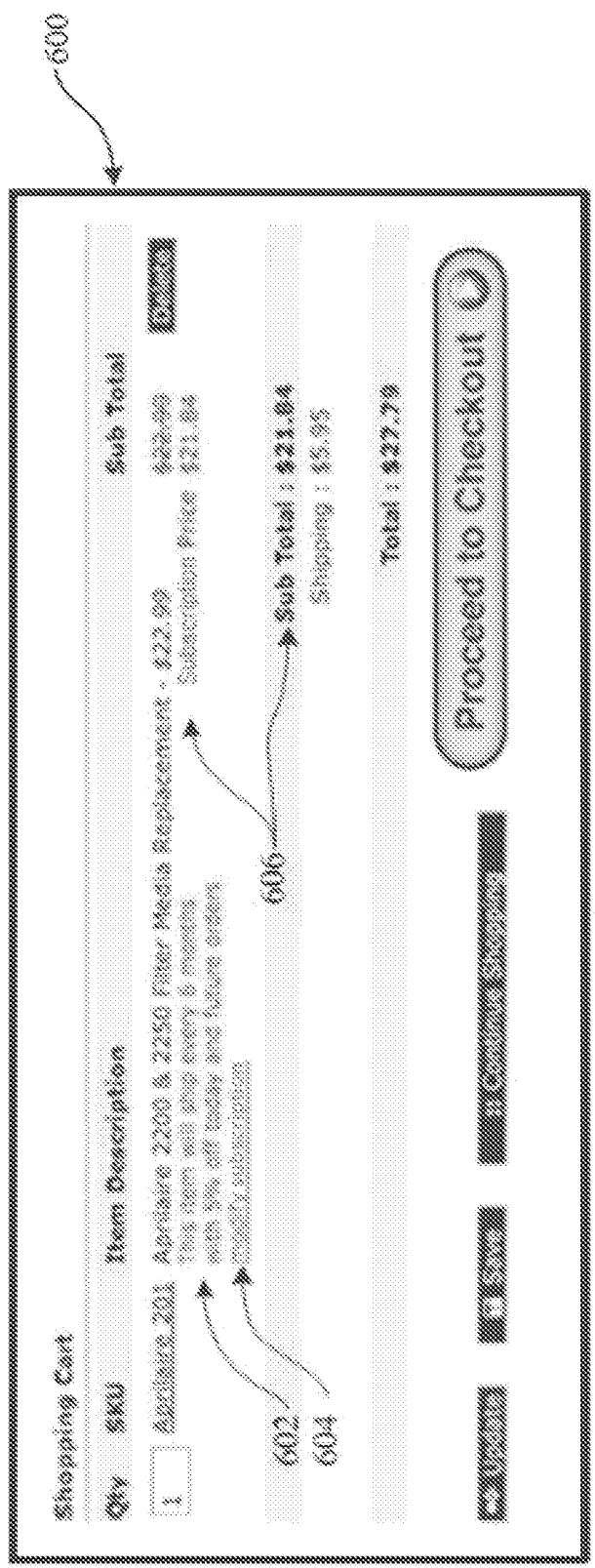
FIG. 6 displays a screenshot of one embodiment of a merchant's online shopping cart with an accepted subscription offer applied.

FIG. 6 depicts a screenshot of a customer's shopping cart 600 on a merchant's website with the subscription related information injected by the system. The subscription terms 602 are displayed to the customer for review. In addition, the option to modify the subscription and/or its terms 604 is available. The discounted price 606 is injected into the merchant's webpage as well.

Figure 7:
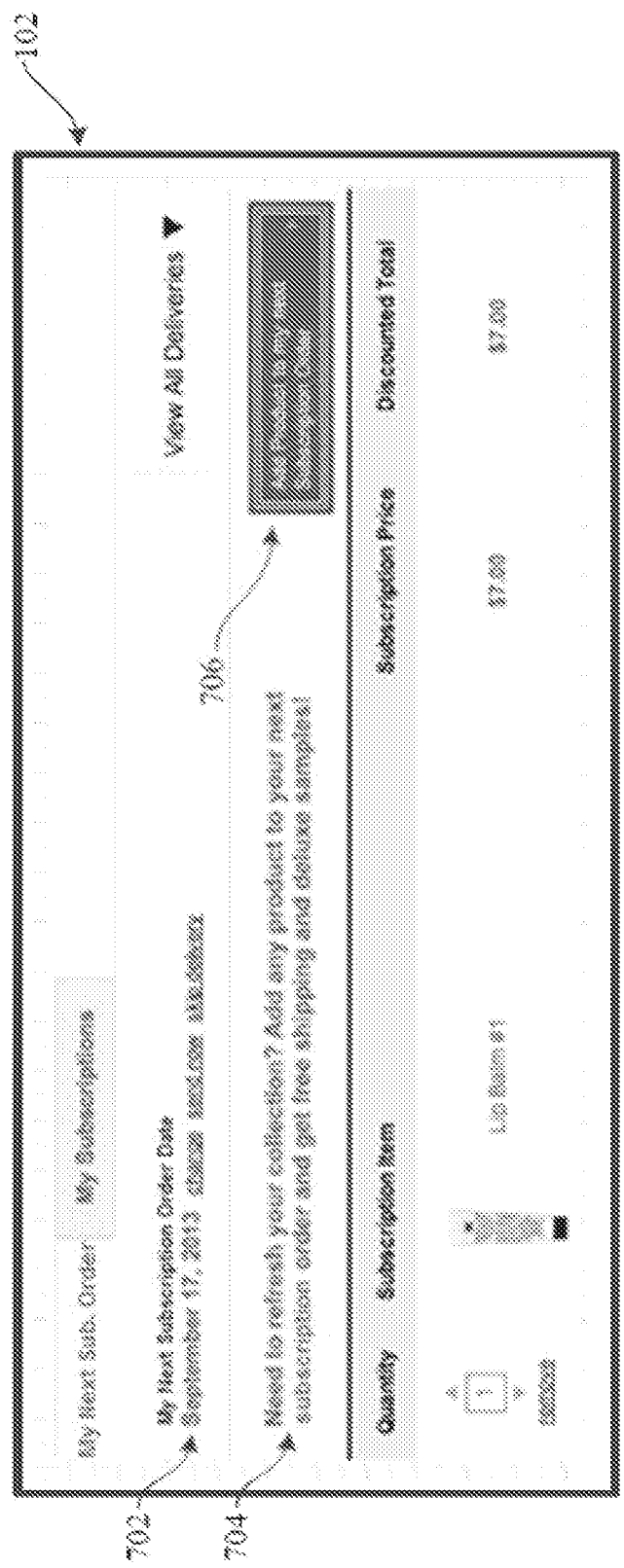
FIG. 7 displays a screenshot of one embodiment of a merchant's customer interface.

FIG. 7 depicts a screenshot of one embodiment of the customer interface 102. The customer interface 102 contains information related to the customer's subscription, options for modification of the subscription, and other subscription related content. The customer interface 102 displays the date of the next subscription order 702, per the terms of the subscription, as well as hyperlinks that allow the customer to edit their subscription details. Multiple individual subscriptions can be managed by the customer via the subscription interface simultaneously.

In some embodiments, the system can also inject an offer 704 to the customer to add another product which is available from that merchant. In this case, the system receives an indication that the customer has selected the product offer when the customer selects the add product button 706.

Figure 8:
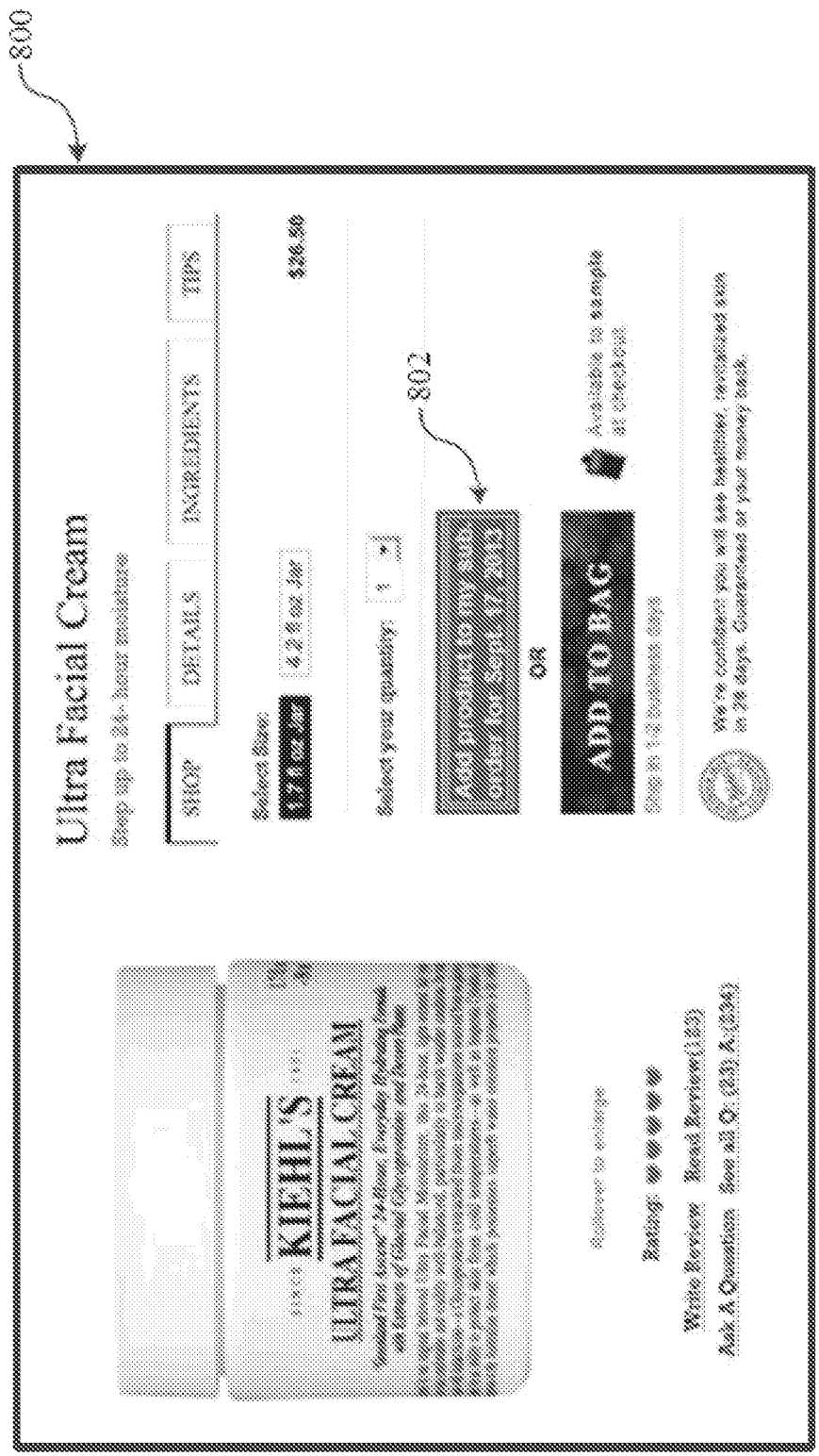
FIG. 8 displays a screenshot of one embodiment of a merchant's product page with an option to add the product to the customer's subscription order injected into the page.

FIG. 8 depicts a screenshot of a merchant's product page 800. The system has injected an offer 802 to add the product related to the product page 800 to an already existing subscription order.

Figure 9:
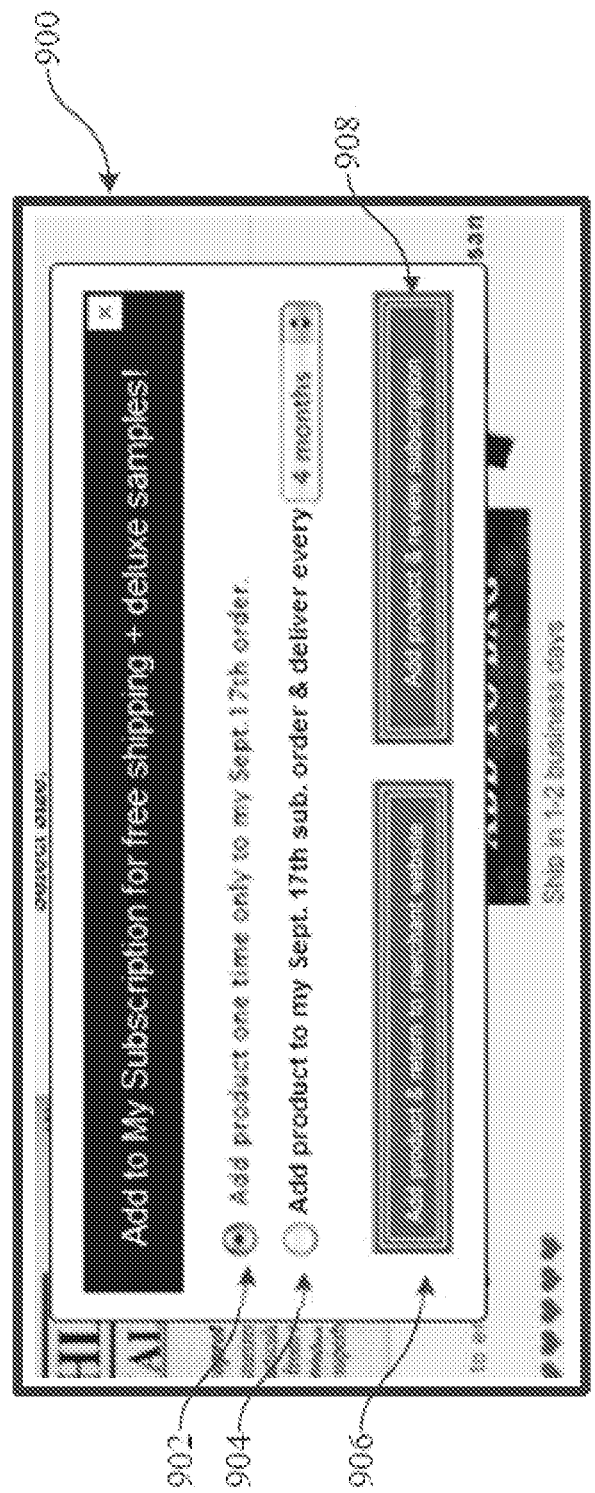
FIG. 9 displays a screenshot of one embodiment of a subscription offer for a customer that has already accepted another subscription offer.

FIG. 9 depicts a screenshot of the webpage response 900 in relation to a customer selecting the subscription offer 802 from FIG. 8. The pop-up window provides the customer with several options related to the subscription offer. In the current embodiment, the first option is to add the product to an existing subscription order 902 for one-time delivery in accordance with the terms of the subscription. In addition, the option to add the product to an existing subscription order and/or modify the subscription order 904 for the product is available. The system collects information related to which selection is made. If the system receives a notification that option 904 was chosen, the frequency for the subscription order related to the product is also received and the subscription order is modified accordingly.

An option to add the product to the customer's online subscription order and return to the merchant's website 906 as well as an option to add the product to the customer's subscription order and to be transferred to a subscription order review webpage 908 are injected by the system. In some embodiments, the system can collect additional information related to the subscription offer 904 such as the quantity of the product desired. In other embodiments, the subscription offer 904 can include incentives to encourage the customer to accept the subscription offer.

Embodiments of the system 100 can provide subscription-related content and subscription-related offers to merchant webservers. The system responds to accepted subscription offers by creating subscription orders and sending them to the merchant websites 112 in accordance with the subscriptions.

Various embodiments of the system 100 operate in an e-commerce environment that includes the Internet 122 or some other wide area network (WAN) to facilitate communications among various parties. These parties include merchants, their customers, and the system. The independent merchant websites typically include numerous product pages 112. Each of these product pages provides information pertaining to a particular and corresponding product to the customers. The independent merchant websites also include shopping carts 116 or similar e-commerce mechanisms to receive, process, accept payment for, and fulfill orders placed by the customers with the merchants. These e-commerce mechanisms would often exist on the merchant website with or without the remainder of the system.

Embodiments of the system allow customers to subscribe to various products while the independent merchants deliver the products in accordance with orders received via shopping carts 116 operated by those merchants. The system 100 does, however, manage the subscription process.

When a customer navigates to a particular merchant website, the merchant website presents to the customer the various product pages 112. The customer browses through these product pages 112 and/or navigates to particular product page 112 according to their interests and desires. The system 100 does not consider in its processing how the customer navigates to a particular product page.

In some embodiments, the system 100 can track the progress of activities in the customer's shopping cart 116 by implementing a controller script that waits until a product page 112 is fully loaded. The system receives an indication 124 from the merchant's website that includes the user's session ID, the merchant's ID, a product ID, etc. The system can use the foregoing information to determine if a product subscription is available. If a subscription is available, the system produces and delivers a subscription offer to the merchant's website.

In various embodiments, the injected offer includes a hypertext markup language (HTML) control that allows the customer to accept the subscription offer. This control does not provide the customer with the capability of actually ordering the product. Rather, this control operates only in the context of accepting the subscription offer. In those situations in which the customer accepts the subscription offer, the system receives an indication of that acceptance. The controller script computes the discounted, subscription-based price for the product and sends that information to the merchant's shopping cart 116 for that customer.

Once the customer completes their shopping, the system 100 creates subscriptions for each product that corresponds to an accepted subscription offer and stores pertinent subscription-related information in a subscription database 104. Thus, as it relates to subscription offers, the system of the current embodiment operates independently of the merchant website. Moreover, the system of the current embodiment manages only the subscriptions and not the customer's orders.

It might be worth noting that a subscription is a contractual agreement between the merchant and the customer whereby the customer often receives a discounted rate on a given product in return for agreeing to purchase that product from the merchant on a regular basis.

In the present embodiment, the system 100 builds subscription orders for a particular product on a day determined in accordance with the terms of the accepted subscription offer. The system 100 can create a file corresponding to that subscription order and transmit that file to the merchant's website via an application program interface (API) 118 provided by the system.

The merchant backend 120 fulfills the order in accordance with their pre-existing practices. The system 100 builds subsequent subscription related orders 110 in accordance with the terms of the subscription.

In some embodiments, the system 100 allows the merchant's customers to access and manage the customer's subscriptions via a subscription interface 102. The system 100 can inject the customer interface 102 into the merchant's website. The content of the subscription interface can be rendered based on the merchant's ID, a randomly generated hash which acts as a password, and/or among other information. After logging into that particular merchant's website, a customer can view their subscriptions related to that merchant and modify the terms of their subscription via the customer interface 102. In addition, the system can accept additional subscriptions from a customer via the customer interface 102.

What is claimed:

1. A method, comprising
receiving an input configured to request data associated with a product;
generating javascript used to render a web page including the data retrieved using a product identifier from a first server;
receiving data representing a web page load status indication that indicates an action occurring on the web page as displayed in a user interface, a received web page load status indication being formed when an action is detected on the web page, the action changing the web page as displayed on the user interface;
invoking a controller script responsive to the web page load status indication to track activities associated with an online shopping cart presented on the web page, the web page load status indication including data representing the activities being further associated with one or more of an offer associated with the product, a session identifier, a merchant identifier, and the product identifier, the offer being retrieved by a second server and presented on the web page;
performing a program call to a platform associated with the second server to determine whether a subscription is associated with the product identifier related to the received web page load status indication;
deploying a widget to the web page, the widget being configured to retrieve the offer from the second server over an application program interface ("API"), the offer being used to build a subscription offer and configured to inject the subscription offer into the widget on the web page;
generating a user control input using a markup language, the user control input being configured to receive data indicating acceptance of the subscription offer on the web page, the markup language being associated with the product identifier if the subscription is associated with the product identifier;
injecting other data into the web page associated with the product identifier, the other data being used to display the data into the web page and the online shopping cart, whereby the other data is rendered with the web page to form a composite interface that is configured to simultaneously present the online shopping cart displaying product content and subscription-related content, the online shopping cart being presented with the web page in the user interface; and using the merchant identifier and a hashing algorithm to generate a password, the password being configured to be transmitted from the platform to the second server in the program call when requesting the other data.

2. The method of claim 1, further comprising rendering, as determined by the second server, the composite interface displaying the product content and the subscription-related content.

3. The method of claim 1, further comprising injecting the product content with the subscription-related content into the web page rendered using a markup language.

4. The method of claim 1, further comprising injecting into the web page the product content with the subscription-related content, wherein the product content is generated in response to a call from a client to the first server and the subscription-related content is generated in response to another call from the client to the second server.

5. The method of claim 1, wherein the platform is associated with a service not associated with the first server.

6. The method of claim 1, wherein the platform is associated with a service provided by the second server.

7. The method of claim 1, wherein the further data is configured, in part, to indicate a frequency associated with the subscription associated with the product.

8. The method of claim 1, wherein the second server is configured to track a subscription order received by the first server, wherein the second server is configured to direct storage of data associated with the subscription order in one or more databases associated with the platform.

9. The method of claim 1, wherein the further data is used to invoke a javascript generation process configured to display a subscription in a visual representation of a shopping cart.

10. The method of claim 1, wherein a markup file is generated by the platform when another input is received indicating the subscription has been ordered, the markup file being generated in HTML.

11. The method of claim 1, wherein a markup file is generated by the platform when another input is received indicating the subscription has been ordered, the markup file being generated in XML.

12. The method of claim 1, wherein a markup file is generated by the platform when another input is received indicating the subscription has been ordered, the markup file being transmitted from the platform to the first server.

13. A system, comprising:
a database configured to store data associated with a product, other data associated with a product identifier configured to identify how to display the data into a web page using a cart system associated with a first server, and further data associated with a subscription and an offer;
logic configured to receive an input configured to request the data associated with the product, to generate javascript used to render the web page including the data retrieved using the product identifier from the first server, to receive data representing a web page load status indication that indicates an action occurring on the web page as displayed in a user interface, a received web page load status indication being formed when an action is detected on the web page, the action changing the web page as displayed on the user interface;
invoke a controller script responsive to the web page load status indication to track activities associated with an online shopping cart presented on the web page, the web page load status indication including data representing the activities being further associated with one or more of an offer associated with the product, a session identifier, a merchant identifier, and the product identifier, the offer being retrieved by a second server and presented on the web page, to perform a program call to a platform associated with the second server to determine whether the subscription is associated with the product identifier related to the received web page load status indication, to deploy a widget to the web page, the widget being configured to retrieve the offer from the second server over an application program interface ("API"), the offer being used to build a subscription offer and configured to inject the subscription-offer into the widget on the web page;

generate a user control input using a markup language, the user control input being configured to receive data indicating acceptance of the subscription offer on the web page, the markup language being associated with the product identifier if the subscription is associated with the product identifier, and to inject other data into the web page associated with the product identifier, the other data being used to display the data into the web page and the online shopping cart associated with the first server, whereby the other data is rendered with the web page to form a composite interface that is configured to simultaneously present the online shopping cart displaying product content and subscription-related content, the online shopping cart being resented with the web page; and use the merchant identifier and a hashing algorithm to generate a password, the password being configured to be transmitted from the platform to the second server in the program call when requesting the other data.

14. A non-transitory computer readable medium having one or more computer program instructions configured to perform a method, the method comprising:

receiving an input configured to request data associated with a product;

generating javascript used to render a web page including the data retrieved using a product identifier from a first server;

receiving data representing a web page load status indication that indicates an action occurring on the web page as displayed in a user interface, a received web page load status indication being formed when an action is detected on the web page, the action changing the web page as displayed on the user interface;

invoking a controller script responsive to the web page load status indication to track activities associated with an online shopping cart presented on the web page, the web page load status indication including data representing the activities being further associated with one or more of an offer associated with the product, a session identifier, a merchant identifier, and the product identifier, the offer being retrieved by a second server and presented on the web page;

performing a program call to a platform associated with the second server to determine whether a subscription is associated with the product identifier related to the received web page load status indication;

deploying a widget to the web page, the widget being configured to retrieve the offer from the second server over an application program interface ("API"), the offer being used to build a subscription offer and configured to inject the subscription offer;

generating a user control input using a markup language, the user control input being configured to receive data indicating acceptance of the subscription offer on the web page, the markup language being associated with the product identifier if the subscription is associated with the product identifier;

injecting other data into the web page associated with the product identifier, the other data being used to display the data into the web page and the online shopping cart associated with the first server, whereby the other data is rendered with the web page to form a composite interface that is configured to simultaneously present the online shopping cart displaying product content and subscription-related content, the online shopping cart being presented with the web page; and using the merchant identifier and a hashing algorithm to generate a password, the password being configured to be transmitted from the platform to the second server in the program call when requesting the other data.

* * * * *